3,645,988
PYRIDYL ACRYLATES AND METHACRYLATES AND DYEABLE ACRYLONITRILE COPOLYMERS PREPARED THEREFROM

Gary G. Hammer and John H. Hennes, Williamsburg, Va., assignors to The Dow Chemical Company, Midland, Mich.
No Drawing. Filed June 17, 1969, Ser No. 834,159
Int. Cl. C08f 7/12, 15/22
U.S. Cl. 260—80.72       7 Claims

ABSTRACT OF THE DISCLOSURE

Pyridyl acrylates or methacrylates are prepared by reacting the sodium salt of a hydroxy substituted pyridine with acrylyl or methacrylyl chloride. Copolymerization of small amounts of the resulting monomer (e.g. 1–10%) with a major proportion (e.g. 85–99%) of acrylonitrile, optionally containing up to about 10% of another copolymerizable monomer (e.g. methyl acrylate) and spinning, results in fibers having excellent dyeability and heat stability.

---

This invention relates to novel pyridyl acrylates and methacrylates. More particularly this invention relates to novel copolymers of acrylonitrile which are rendered dyeable by conventional methods with acid dyestuffs by virtue of the incorporation of small amounts of novel pyridyl acrylates or methacrylates.

It is well-known that polyacrylonitrile and certain copolymers containing a large proportion of acrylonitrile along with other polymerizable mono olefinic monomers provide excellent fiber forming compositions. It is also known that such polymers and copolymers of acrylonitrile are generally very difficult to dye but that certain monomers copolymerized with the acrylonitrile can improve the dyeability of fibers produced from the copolymer. Often, however, such copolymers detrimentally influence chemical and physical characteristics of the fibers as its heat stability.

Accordingly, it is an object of this invention to provide novel monomers.

It is a further object of this invention to provide co-monomers which will produce copolymers of acrylonitrile having superior dyeing characteristics.

Still another object of this invention is the production of acrylonitrile copolymers having good dyeability with acid dyes without causing detrimental effects in other physical and chemical characteristics of the copolymer.

Still further objects and advantages of the present invention will be apparent from the following description.

Briefly, the novel pyridyl acrylate and methacrylate monomers of this invention can be characterized by the following formula:

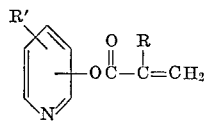

wherein

R is hydrogen or methyl; and
R' is hydrogen, methyl, halogen or cyano.

The novel pyridyl acrylates or methacrylates corresponding to the above formula can be prepared by reacting an alkali metal, e.g. sodium, salt of a hydroxy substituted pyridine with acrylyl or methacrylyl halide, e.g. acrylyl chloride. Reaction is conducted in an inert aliphatic aromatic hydrocarbon or halogenated hydrocarbon solvent, e.g. methylene chloride.

The copolymers of the above described pyridyl acrylates or methacrylates with acrylonitrile constitute an important aspect of this invention. These copolymers comprise the copolymerized product of:

(a) 1–10 weight percent of the novel pyridyl acrylates or methacrylate monomer having the above formula,
(b) 85–99% by weight of acrylonitrile,
(c) 0–10% by weight of an alpha, beta-ethylenically unsaturated monomer copolymerizable with acrylonitrile and different from (a) and (b).

The total of the weight percentages is 100.

The co-monomer (c) is optional and it need not be present in order to derive copolymers having the advantages described herein. Where used, the alpha, beta-ethylenically unsaturated monomer can be any of the monomers which are known to be polymerizable with acrylonitrile. Among these there may be mentioned the lower alkyl esters, amides and nitriles of acrylic and methacrylic acid and other vinyl compounds such as vinyl acetate and styrene. Illustrative co-monomers include methylacrylate, methylmethacrylate, ethylacrylate, ethylmethacrylate, acrylamide, methacrylamide, methacrylonitrile, vinyl acetate and the like.

The copolymers of this invention can be prepared by any of the procedures which are conventional for acrylonitrile polymers and copolymers. It is convenient, however, to conduct the polymerization in an aqueous solution of a salt, e.g. zinc chloride, or other highly hydrated salts whose solution dissolves both the monomers and the copolymers. Such a polymerization solution may be used directly for spinning filaments of the copolymer into a coagulating bath comprising a weaker solution of the salt used in the polymerization solvent. When the copolymer is prepared in other ways it can be recovered from the polymerization system and dissolved in any of the well-known solvents for acrylonitrile copolymers and spun from such a solution in the known manner.

Most preferably, the polymerization is conducted in an aqueous solution containing about 60% zinc chloride. The temperature should be in the range of 40–80° C. below 40° C. the reaction does not start and above 80° C. the copolymer tends to degrade.

The preferred catalyst romprises a water soluble peroxide, e.g. $H_2O_2$ in amount ranging from 0.08 to 2.0 weight percent based on the monomers. Below about 0.08% conversion to polymer is low and above about 2.0% the molecular weight of the polymer decreases. The second component in the catalyst system is preferably $Fe^{+++}$ in the concentration of 2 to 5 p.p.m. based on the monomers. Outside this range the molecular weight of the polymer is adversely effected.

Normally and perferably $Cu^{++}$ is added to the reaction mix in the amount of 0.22 to 0.27 p.p.m. based on the monomers. Outside this range the molecular weight of the polymer is adversely effected.

The polymers prepared in the manner described are extruded through a multi-orifice spinnerette into a coagulating bath containing about 45% zinc chloride solution at the temperature of 15–20° C. The coagulated filaments are washed to reduce their salt content and stretched about 1000 percent while passing through a hot water bath maintained at a temperature of about 99.5° C. The filaments are then dried in a relaxed state in an oven.

The invention can be best understood by reference to the following examples which are given by way of illustration and not by limitation. Parts and percentages where not otherwise defined are by weight.

EXAMPLE 1

This example illustrates the preparation of 3-pyridyl methacrylate, one of the acrylonitrile modifiers in this invention.

One mole of 3-pyridinol was dispersed in 1.05 moles of 5 N NaOH. To this mixture was added 300 ml. of $CH_2Cl_2$, which was followed by the slow addition of 109.5 grams of methacrylyl chloride. The temperature of the reaction was kept below 20° C. After addition, the layers were separated, and the organic layer was distilled to recover the 3-pyridyl methacrylate. One hundred and thirty-eight grams of the monomer was recovered which had a purity of 97% and a boiling point of 95–98° C. at 2 mm. pressure.

EXAMPLE 2

This example illustrates the preparation of a directly spinnable mixture of a copolymer of acrylonitrile and a novel modifying monomer of this invention.

Three parts of the 3-pyridyl methacrylate prepared in Example 1, along with 89.0 parts of acrylonitrile, 8 parts of methyl acrylate were added to 900 parts of a 60% aqueous $ZnCl_2$ solution containing 2.5 p.p.m. $Fe^{3+}$ and 0.25 p.p.m. $Cu^{2+}$ in a reaction vessel equipped with a stirrer and thermometer. The pH of the mixture (10:1 dilution with demineralized water) was 2.5. The reaction vessel was placed in a constant temperature bath maintained at 50° C. and the reaction initiated by the addition of 0.09 part hydrogen peroxide. The mixture was stirred for 3 hours during which reaction was completed.

The above condtions and quantities were chosen so as to obtain a polymer solution suitable for spinning, i.e., 2000–3000 poise at 22° (Brookfield) and 9–10% solids.

EXAMPLE 3

This example illustrate the spinning of fibers and dyeing of a fabric prepared from the novel acrylonitrile copolymers of this invention.

The polymer solution of Example 2 was debubbled to remove unreacted monomers and dissolved gas and then extruded through a multiorifice spinnerette into a coagulation bath containing about 44% zinc chloride solution at 17° C. The so-coagulated filaments were washed with water to reduce their salt content and then stretched about 1000% while passing through a hot water bath maintained at a temperature of 99.5° C. The filaments were then dried in a relaxed state in an oven set at about 125° C. The dried fibers were knit into fabric and swatches were dyed with Calcocid Alizarin Blue SBA. The fiber dyed to much deeper shades than did either pure polyacrylonitrile or fiber obtained from acrylonitrile/methyl acrylate copolymer.

EXAMPLE 4

This example illustrates the excellent whiteness and heat stability of the fibers prepared by copolymerizing acrylonitrile with the novel comonomers of this invention.

The polymerization of Example 2 and the spinning of Example 3 were repeated with the exception that each of four basic monomers were substituted in equal amounts for the 3-pyridyl methacrylate monomer. The fibers were tested for initial color and heat stability. The results are tabulated in Table I below.

Initial color is a measure of whiteness of the undyed fiber and is determined as follows: The fiber is cut into small pieces and chopped into a slurry in a Waring Blendor. The slurry is then filtered through a Buchner-type funnel to form a pad which is then dried. L and b values are determined with a Hunter Color and Color Difference Meter; L=lightness, b=yellowishness. The numerical rating given for whiteness is obtained using the formula L—3b. The higher the numerical rating, the whiter the sample.

Heat stability is determined as follows: The fiber pad is placed between the plates of an AATCC Scorch Tester at 205° C. for five minutes. The measuring head of a Photovolt Corporation Reflectometer fitted with a green tristimulus filter is placed first on the unscorched portion of the fiber pad and the instrument adjusted for a reflectance reading of 100; a reflectance reading is then taken on the scorched portion of the fiber pad. The difference in reflectance is a measure of the color formations due to heat. In other words, the smaller the recorded value, the better the heat stability of the polymer.

TABLE I

| Basic monomer | Initial color | Heat stability |
| --- | --- | --- |
| Dimethylaminoethylmethacrylate | 47.5 | 84 |
| 2-vinylpyridine | 68.6 | 47 |
| 2-methyl-5-vinylpyridine | 64.8 | 45 |
| p-Dimethylaminomethylstyrene-hydrochloride | 59.0 | 68 |
| 3-pyridyl methacrylate | 73.0 | 39 |

It will be apparent that variations can be made in the invention described and illustrated with specific embodiments above, without departing from the spirit and scope of the invention as defined in the appended claims.

What is claimed is:

1. A composition of matter comprising the copolymerized product of
   (A) 1–10 weight percent of a monomer having the formula

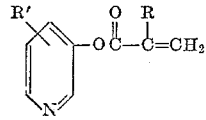

wherein R is hydrogen or methyl; and R' is hydrogen, methyl, halogen or cyano;
   (B) 85–99 weight percent of acrylonitrile;
   (C) 0–10 weight percent of an $\alpha,\beta$-ethylenically unsaturated monomer copolymerizable with acrylonitrile and different from (A) and (B);
   the total of said weight percentages being 100.

2. The composition of matter of claim 1 wherein (A) has the formula

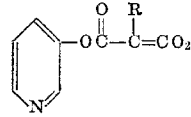

3. The composition of claim 1 wherein (A) is 3-pyridyl methacrylate.

4. The composition of matter of claim 1 wherein (A) is 3-pyridyl methacrylate and (C) is methyl acrylate.

5. The composition of matter of claim 1 wherein (C) is selected from the group consisting of the lower alkyl esters of acrylic and methacrylic acid, acrylamide, methacrylamide, methacrylonitrile and vinyl acetate.

6. The composition of matter of claim 1 wherein the (C) monomer is present in the amount of 0 weight percent.

7. The composition of matter of claim 1 wherein (A) is present in the amount of 3–5 weight percent and (C) is present in the amount of 6–8 weight percent.

References Cited

UNITED STATES PATENTS

| | | | |
| --- | --- | --- | --- |
| 2,771,461 | 11/1956 | Weinstock | 260—85.5 |
| 3,004,957 | 10/1961 | Lynn | 260—85.5 |
| 3,065,212 | 11/1962 | Milford et al. | 260—85.5 |
| 3,240,739 | 3/1966 | Murdock et al. | 260—85.5 R |
| 3,438,993 | 4/1969 | Carmel et al. | 260—295 |

HARRY WONG, JR., Primary Examiner

U.S. Cl. X.R.

260—29.6, 85.5, 86.1, 88.3, 88.7, 294.9, 295

UNITED STATES PATENT OFFICE
CERTIFICATE OF CORRECTION

PO-1050 (5/69)

Patent No. 3,645,988     Dated 29 February 1972

Inventor(s) Gary G. Hammer and John H. Hennes

It is certified that error appears in the above-identified patent and that said Letters Patent are hereby corrected as shown below:

Column 4, line 45, change "O$_2$" to --H$_2$-- in the formula to read:

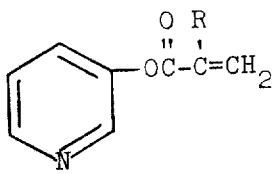

Signed and sealed this 3rd day of October 1972.

(SEAL)
Attest:

EDWARD M. FLETCHER, JR.
Attesting Officer

ROBERT GOTTSCHALK
Commissioner of Patents